May 2, 1961 H. G. SHY 2,982,505
ADJUSTABLE DIAMETER CLIPS
Filed March 23, 1959

INVENTOR
Harry George Shy

BY Cushman, Darby & Cushman
ATTORNEYS

United States Patent Office 2,982,505
Patented May 2, 1961

2,982,505

ADJUSTABLE DIAMETER CLIPS

Harry George Shy, Huntington, W. Va., assignor to General Metals Corporation, Adel Precision Products Division, Huntington, W. Va., a corporation of California Filed Mar. 23, 1959, Ser. No. 801,383

5 Claims. (Cl. 248—74)

This invention relates to conduit supporting clips and more particularly to an improved cushion for such clips.

Conduit supporting clips of the cushioned metal strap type are well-known and are in wide use, particularly in aircraft installations. Clips of this type generally embody a metal strap which is bent to form a central loop portion having apertured end portions extending outwardly therefrom, usually in a substantially tangential direction. The interior surface of the metal strap has provided thereon a cushion of resilient material such as rubber or the like.

In aircraft installations, the effectiveness of the securement of such clips is of significant importance. It would amount to false economy to reduce the cost of clips utilized in aircraft installation by reducing the quality thereof if the chances of failure are even slightly increased. Clearly, where it is possible that the malfunctioning of a clip may cause destruction of a piece of equipment as costly as an airplane, it is important that they effectively perform their function with substantially no margin of error. Consequently, it has been the practice heretofore for airplane manufacturers to maintain a complete stock of such clips in all sizes within a desired range at increments of 1/16". It can be seen that the necessity to employ such different size clips creates a serious inventory problem.

There have been many attempts to alleviate the inventory problem by providing cushions which are yieldable through a considerable extent and thus capable of being usable on more than one size conduit. In general, these proposals have not been satisfactory and have not been adopted by the industry. For example, assuming that a clip of this type is adapted to replace clips 7/8" diameter, 15/16" diameter and 1" diameter, these diameters are accommodated by yielding of the cushioning material. In practice, it has been found that such clips are sufficiently efficient only for one size, for example, the 15/16" diameter. Where a 1" diameter conduit is supported there is too much compression of the cushioning material and the clip will not be secured properly, while the supporting of a 7/8" diameter conduit results in too little compression of the cushioning material and the conduit is not held firmly enough.

The most significant disadvantage of all of the previous proposals of this type is that accommodation of various sizes is made by a compression or expansion of the cushioning material. To this end, various different cushioning materials and cushion shapes have been proposed which attempt to provide a more efficient compression of the material. However, in practice it has been found that such clips are sufficiently effective on only one size even though they serve to grip off size conduit better than a conventional rubber strip.

The present invention presents a completely different solution to the problem, namely accommodation of different size conduits by the removal of cushioning material. In this way, a constant high holding efficiency can be maintained, since this latter characteristic is not dependent upon the expansion or compression of the cushioning material itself.

Accordingly, it is an object of the present invention to provide a conduit supporting clip of the type described having improved cushioning means thereon which is effective to accommodate various size conduits, thus alleviating to a considerable extent the inventory problems presently confronting the industry.

Another object of the present invention is the provision of a cushioning means for a conduit supporting clip, which cushioning means embodies a plurality of strips or layers of cushioning material which can be easily manually detached or peeled off to accommodate conduit of various diameters.

These and other objects of the present invention will become more apparent during the course of the following detailed description and following claims.

The invention may best be understood with reference to the accompanying drawings, wherein an illustrative embodiment is shown.

Figure 1:
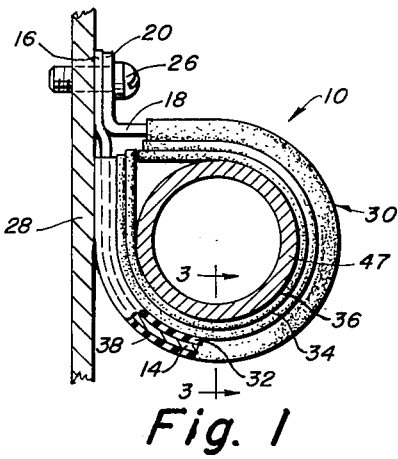
Figure 1 is a side elevational view, partly in section, of a conduit supporting clip embodying the principles of the present invention showing the same in supporting relation to a relatively small conduit.
Figure 2:
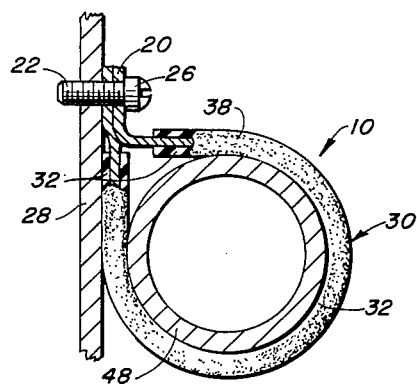
Figure 2 is a view similar to Figure 1 illustrating the clip supporting a relatively large conduit.
Figure 3:
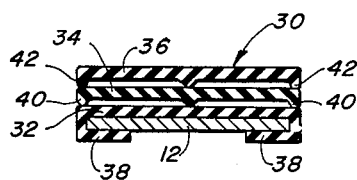
Figure 3 is an enlarged, fragmentary cross-sectional view taken along the line 3—3 of Figure 1.

Referring now more particularly to the drawings, there is shown in Figures 1–3 a conduit supporting clip, generally indicated at 10, which embodies the principles of the present invention. The clip 10 comprises a metal strap 12, of aluminum or the like, which is bent to provide a central conduit embracing loop portion 14 having one end portion 16 extending tangentially therefrom. Extending tangentially from the opposite end of the loop portion 14 is an end portion 18, the outer extremity of which is bent at right angles to provide an outer extremity 20 arranged to abut the outer extremity of the end portion 16. Formed in the end portions 16 and 20 are apertures 22 and 24 which, when the clip is disposed in operative position as shown in Figure 1, are arranged in alignment to receive a fastening element 26 such as a screw, bolt or the like. As shown in Figure 1, the bolt extends through a suitable support 28 to which the clip 10 is secured.

The clip 10 also includes cushion means, generally indicated at 30, which covers the interior periphery of the loop portion of the strap. The cushion means 30 of the present invention comprises a plurality of superposed strips 32, 34 and 36, made of a suitable cushioning material such as natural rubber, synthetic rubber, plastic or the like. While there have been illustrated in the drawings three strips, it will be readily understood that any desired number of strips may be employed as, for example, two or more than three. The outer strip 32 of the series of strips forming the cushion means 30 is secured to the loop portion 14 of the strap 12 by any suitable means. To this end, the strip 32 may be formed with integral attaching flanges 38 arranged to engage the exterior surface of the loop portion of the strap. It will be understood that the outer strip 32 may be joined directly to the interior surface of the loop portion of the strap, as by adhesive, or fastened thereto as by staples or the like. Moreover, the outer strip can be made of sleeve construction within which the metal strap 12 is positioned.

Figure 4:
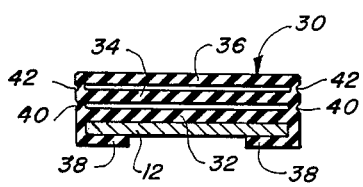
Figure 4 is a view similar to Figure 3 illustrating a modified form of the invention.

As best shown in Figure 3, the intermediate strip 34 is secured to the inner periphery of the strip 32 by any suitable means which permit the strip 34 to be easily manually removed or detached from the strip 32. As shown, the strip 34 has thin ribs 40 formed on the opposite sides thereof, which ribs are cured or otherwise secured to the inner periphery of the strip 32. In a like manner, the inner strip 36 is secured to the strip 34 so that it may be easily removed therefrom. As before, the strip 36 has thin ribs 42 formed on opposite sides thereof for securement to the inner periphery of the intermediate strip 34. It will also be understood that the three strips or layers 32, 34 and 36 may be formed of one extrusion in which case the ribs 40 and 42 are made integral, as shown in Figure 4. However, they must be sufficiently thin so that they are easily manually frangible or can be easily torn apart by manually peeling one or more of the strips back with respect to the adjacent strip.

Figure 5:
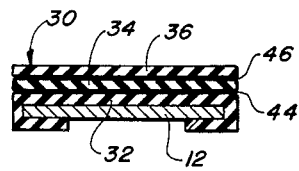
Figure 5 is a view similar to Figure 3 illustrating still another modified form of the invention.

It will be understood that other means may be provided for securing the strips together so that they are easily manually detached or removed with respect to each other. In Figure 5, the strip 34 is secured to the strip 32 in abutting relation by the use of a suitable adhesive 44 and, in a like manner, the strip 36 is secured to the strip 34 by an adhesive 46 of a similar nature.

The most significant advantage of the present invention is that the three layer construction of the cushion means provides the supplier with an effective manner in which he can reduce the number of different size clips he must maintain in his inventory. As indicated above, most aircraft manufacturers will maintain in their inventories clips throughout a given range in sizes of increments of $\frac{1}{16}''$. With the three layer clip illustrated, the number of sizes which a manufacturer need inventory can be reduced to one-third. For example, assuming the metal strap and outer strip or layer 32 is to accommodate a conduit of a 1" diameter, the strips 34 and 36 are made of a thickness of $\frac{1}{32}''$. Thus, as shown in Figure 1, with both strips 34 and 36 attached to the strip 32, the present clip 10 will readily accommodate a conduit of a $\frac{7}{8}''$ diameter such as indicated at 47 in Figure 1. By removing or peeling off the inner strip 36, the conduit clip will not accommodate a conduit having a diameter of $\frac{15}{16}''$. Finally, by peeling off both of the strips 34 and 36, the clip 10 will now accommodate a conduit of a 1" diameter such as indicated at 48 in Figure 2. Of primary significance is the fact that the gripping efficiency of the clip when supporting the conduit 47 is the same as that when the same is supporting the conduit 48, for the reason that the compression of the cushion means 30 is substantially the same. The difference in diameter is accommodated by removing a portion of the cushioning material, rather than by varying the yielding movement of the same. Of course, greater reductions in inventories can be obtained by increasing the number of strips.

It will also be noted that the cushion means 30 will ordinarily be manufactured in straight strip form and cut to a sufficient size to cover the interior of the loop portion of the strap. It will be noted that when the three strips are deformed into arcuate configuration about the loop portion of the strap, the inner strip 36 will extend in a smaller loop than the outer strip 32. In this way, the extremities of the inner strip will tend to extend outwardly of the extremities of the next adjacent strip thus providing the user with a tab-like structure on the inner strip which can be grasped to peel off the same when desired. This relationship is particularly true of the embodiment illustrated in Figures 1–3.

It will be understood that there are many attendant advantages to the reduction in inventory made possible by the present invention. Because a lesser number of sizes of conduit clips is required, the attendant paper work necessary to the maintenance of the inventory is reduced. In addition, the adjustability of the clip provides savings in man hours in installation time.

The term "conduit" as herein used embraces within its meaning tubes, wires, bunches of wires and the like.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:
1. A conduit supporting clip comprising a metal strap bent to form a central loop portion and apertured end portions extending outwardly therefrom, and cushion means positioned on the interior periphery of the loop portion of said strap, said cushion means comprising a plurality of strips of cushioning material of a thickness of the order of $\frac{1}{32}$ of an inch and means securing said strips together in superposed relation for easy manual detachment with respect to each other whereby said cushion means can be altered to accommodate conduits of varying diameter by selective detachment of said strips with respect to each other.

2. A conduit supporting clip as defined in claim 1 wherein said strip securing means comprises thin frangible ribs interconnected between adjacent strips.

3. A conduit supporting clip as defined in claim 1 wherein said strip securing means comprises an adhesive material.

4. In a conduit supporting clip comprising a metal strap bent to form a central loop portion and apertured end portions extending outwardly therefrom, and cushion means on the interior periphery of the loop portion, the improvement comprising said cushion means including at least three strips of cushioning material and means securing said strips together in superposed relation for easy manual detachment with respect to each other so that said clip will efficiently accommodate at least three different size conduits by selective detachment of said strips with respect to each other.

5. The improvement as defined in claim 4 wherein said strip securing means comprises thin longitudinally extending frangible ribs interconnected between adjacent strips on opposite sides thereof.

References Cited in the file of this patent

UNITED STATES PATENTS

| | | |
|---|---|---|
| 2,387,295 | Robertson | Oct. 23, 1945 |
| 2,397,253 | Ellinwood | Mar. 26, 1946 |
| 2,542,405 | Fink | Feb. 20, 1951 |